(12) United States Patent
Zhang

(10) Patent No.: US 12,482,865 B2
(45) Date of Patent: Nov. 25, 2025

(54) WOUND BATTERY AND ENERGY STORAGE DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventor: Qin Zhang, Fujian (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 725 days.

(21) Appl. No.: 17/950,482

(22) Filed: Sep. 22, 2022

(65) Prior Publication Data

US 2023/0013882 A1     Jan. 19, 2023

Related U.S. Application Data

(63) Continuation of application No. PCT/CN2021/108725, filed on Jul. 27, 2021.

(30) Foreign Application Priority Data

Jul. 28, 2020    (CN) .......................... 202021527556.3

(51) Int. Cl.
*H01M 10/0587*     (2010.01)
*H01M 10/04*         (2006.01)
(Continued)

(52) U.S. Cl.
CPC ... *H01M 10/0587* (2013.01); *H01M 10/0431* (2013.01); *H01M 50/136* (2021.01); *H01M 50/411* (2021.01)

(58) Field of Classification Search
CPC .. H01M 4/667; H01M 4/668; H01M 10/0587; H01M 50/136
See application file for complete search history.

(56) References Cited

U.S. PATENT DOCUMENTS

| 2012/0328921 A1* | 12/2012 | Kawaoka | ............ H01M 10/052 429/211 |
| 2020/0313196 A1* | 10/2020 | Shao | ..................... H01M 4/661 |

FOREIGN PATENT DOCUMENTS

| CN | 1992398 A | 7/2007 |
| CN | 106898825 A | 6/2017 |

(Continued)

OTHER PUBLICATIONS

EPO, Extended European Search Report for corresponding European Patent Application No. 21850342.3, Apr. 16, 2024, 6 pages.
(Continued)

*Primary Examiner* — Christopher P Domone
(74) *Attorney, Agent, or Firm* — IP Spring

(57) ABSTRACT

A wound battery which relates to the field of batteries. The wound battery is formed by winding a battery sheet. The battery sheet is flexible and includes a flexible current collector, a positive active layer, a negative active layer, and an insulating separator which is formed on a surface of the positive active layer and/or a surface of the negative active layer, and is configured to prevent the positive active layer from directly contacting the negative active layer.

20 Claims, 4 Drawing Sheets

(51) Int. Cl.
 *H01M 50/136* (2021.01)
 *H01M 50/411* (2021.01)

(56) References Cited

FOREIGN PATENT DOCUMENTS

| | | |
|---|---|---|
| CN | 107240721 A | 10/2017 |
| CN | 111180737 A | 5/2020 |
| CN | 212659582 U | 3/2021 |

OTHER PUBLICATIONS

CNIPA, International Search Report for International Patent Application No. PCT/CN2021/108725, Sep. 27, 2021, 5 pages.
CNIPA, Written Opinion for International Patent Application No. PCT/CN2021/108725, Sep. 27, 2021, 7 pages.

* cited by examiner

WOUND BATTERY AND ENERGY STORAGE DEVICE

CROSS-REFERENCE TO RELATED APPLICATIONS

This application is a continuation under 35 U.S.C. § 120 of International Patent Application No. PCT/CN2021/108725, filed Jul. 27, 2021, which claims priority under 35 U.S.C. § 119(a) and/or PCT Article 8 to Chinese Patent Application No. 202021527556.3, filed Jul. 28, 2020. The entire disclosures of International Patent Application No. PCT/CN2021/108725 and Chinese Patent Application No. 202021527556.3 are incorporated herein by reference.

TECHNICAL FIELD

This disclosure relates to the field of batteries, and in particular to a wound battery and an energy storage device.

BACKGROUND

A wound battery is formed by winding a battery sheet. At present, in the wound battery, the battery sheet usually includes a separator, and a positive electrode sheet and a negative electrode sheet which are distributed on two sides of the separator. Generally, an existing wound battery has a relatively large thickness, but space is relatively limited in a usage scenario, such that an energy density is difficult to be further improved.

SUMMARY

A wound battery formed by winding a battery sheet is provided in implementations of the present disclosure. The wound battery can include a separator and a flexible battery sheet with an integrated structure. The battery sheet can include a current collector, a positive active layer, and a negative active layer. The current collector can have an insulating layer as a substrate, and a positive metal layer and a negative metal layer which are formed on surfaces of two sides of the insulating layer, the positive active layer is formed on a surface of the positive metal layer, and the negative active layer is formed on a surface of the negative metal layer. The separator can be laminated on and cover a surface of the positive active layer and/or a surface of the negative active layer, and configured to prevent the positive active layer from directly contacting the negative active layer.

An energy storage device is provided in implementations of the present disclosure. The energy storage device includes a wound battery. The wound battery can include a separator and a flexible battery sheet with an integrated structure. The battery sheet can include a current collector, a positive active layer, and a negative active layer. The current collector can have an insulating layer as a substrate, and a positive metal layer and a negative metal layer which are formed on surfaces of two sides of the insulating layer, the positive active layer is formed on a surface of the positive metal layer, and the negative active layer is formed on a surface of the negative metal layer. The separator can be laminated on and cover a surface of the positive active layer and/or a surface of the negative active layer, and configured to prevent the positive active layer from directly contacting the negative active layer.

BRIEF DESCRIPTION OF THE DRAWINGS

In order to explain technical solutions in implementations of the present disclosure more clearly, the following will give a brief introduction to accompanying drawings which are needed to be used in description of the implementations or the related art. It should be understood that followings drawings only illustrate some implementations of the present disclosure and thus should not be considered as limitation to the scope. For those of ordinary skill in the art, other accompanying drawings can be obtained according to these accompanying drawings without creative efforts.

Figure 1:
FIG. 1 is a schematic structural diagram of a positive electrode sheet in an existing wound battery.

Signs: 900—existing wound battery; 91—positive electrode sheet; 911—positive active material layer; 912—positive current collector; 92—negative electrode sheet; 921—negative active material layer; 922—negative current collector; 93—second separator; 300—wound battery; 100—battery sheet; 101—insulating layer; 102—positive metal layer; 103—negative metal layer; 104—positive active layer; 105—negative active layer; 200—current collector; 201—first separator; 301—initial wound end; 302—first folding portion; 303—second folding portion; 304—penultimate folding portion; 305—ending wound end; 400—energy storage device.

DETAILED DESCRIPTION

As an important application area of lithium-ion batteries, wound batteries are widely used in various terminal devices such as electronic devices (e.g., watches, mobile phones, etc.). At present, these devices tend to be highly integrated and miniaturized, therefore, a volume of a wound battery is required to be further reduced. On the other hand, in view of long-term operation of the above electronic devices, an energy density of the wound battery is desired to be sufficiently high to avoid frequent charging.

Based on the above present situation, higher requirements are substantially put forward to manufacturers of wound batteries, that is, a higher energy density is needed in a relatively small volume.

Therefore, at present, the industry usually chooses to improve electrode materials, for example, chooses to use active materials which can provide higher energy densities, such as various ternary materials. However, a present situation is that electrode materials are difficult to be developed. In addition, although some materials can provide high energy densities, other problems may also be accompanied, for example, short service life, unfriendly environment, difficult fabrication, etc.

In view of this, the inventor finds a new path and chooses to improve a structure of a wound battery, so as to avoid a great difficulty in improving active materials. In addition, through practical verification, a solution proposed by the inventor has indeed improved the aforementioned problems to a certain extent.

Specifically, in implementations, a wound battery with a new type of structure is provided by the inventor. The battery can provide a larger winding density, such that under a condition of an identical volume, the battery can provide more power supply space (more bearing space for active materials lead to more carried active materials).

In addition, in the wound battery, apart from an effect that the energy density is improved being obtained, improved accurate alignment of a positive electrode and a negative electrode is also unexpectedly shown.

In the implementations, unlike the existing wound battery, the wound battery of the present disclosure does not adopt a solution of separating an independently fabricated positive electrode sheet and an independently fabricated negative electrode sheet by a second separator and then winding them with a second additional separator.

Instead, the wound battery of the present disclosure is fabricated by combining current collectors of the positive electrode sheet and the negative electrode sheet. In other words, an insulating material is used as a substrate, and then a positive current collector and a negative current collector are fabricated on two sides of the insulating material, such that a current collector with an integrated structure is formed. Then, on the basis of the current collector, a positive active material and a negative active material are attached to two sides of the current collector respectively (a battery sheet with the integrated structure is formed, and the battery sheet can be made thinner and easier to be curled with a high density), and then a first separator is used for winding.

In the above-described wound battery of the present disclosure, since each electrode sheet is not independently fabricated, an integrated structure is formed. In terms of structure, the wound battery can be determined to have a two-layer structure, which is a separator layer and an internal energy supply layer respectively. In contrast, the existing wound battery is formed in the form of four layers of winding.

Therefore, the thickness of the wound battery of the present disclosure can be effectively reduced, and the high requirement for alignment accuracy is reduced, such that the wound battery can be fabricated with the higher winding density, the higher energy density can be obtained, and accurate alignment of the positive electrode and the negative electrode can be easily realized in use.

The wound battery in the implementations of the present disclosure will be described below with reference to the accompanying drawings.

Figure 2:
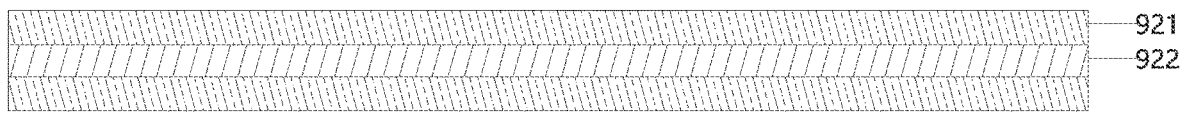
FIG. 2 is a schematic structural diagram of a negative electrode sheet in an existing wound battery.
Figure 3:
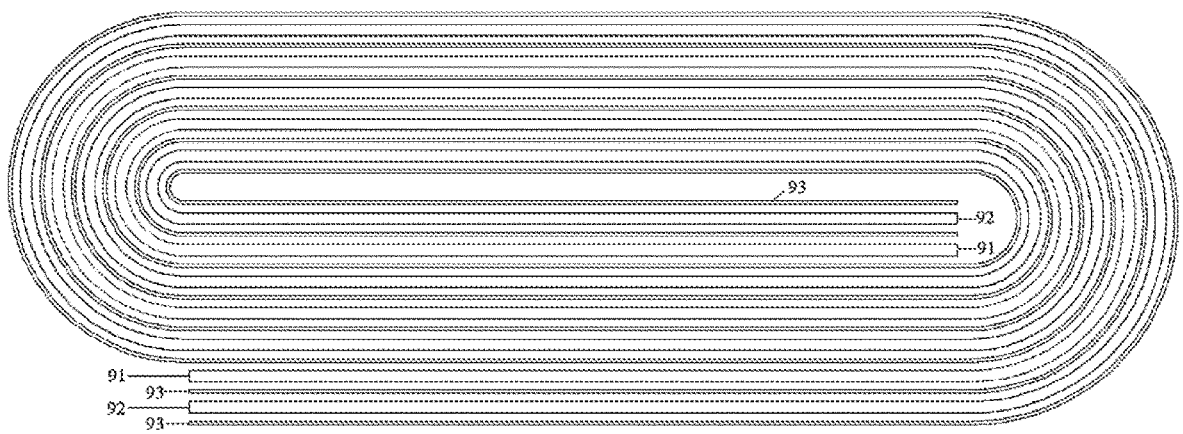
FIG. 3 is a schematic structural diagram of the existing wound battery fabricated based on the above positive electrode sheet in FIG. 1 and the above negative electrode sheet in FIG. 2.

Reference can be made to FIG. 1, FIG. 2, and FIG. 3. In order to facilitate understanding of those of ordinary skill in the art, a structure of an existing wound battery 900 as an improvement basis is provided by the inventor, and has a positive electrode sheet 91, a negative electrode sheet 92, and two second separators 93.

The positive electrode sheet 91 includes a positive current collector 912 and a positive active material layer 911 which is used for a positive electrode and attached to a surface of the positive current collector 912. In addition, as can be seen from FIG. 1, the positive active material layer 911 wraps the positive current collector 912 inside.

The negative electrode sheet 92 includes a negative current collector 922 and a negative active material layer 921 which is used for a negative electrode and attached to a surface of the negative current collector 922. In addition, as can be seen from FIG. 2, the negative active material layer 921 wraps the negative current collector 922 inside.

As can be clearly seen from FIG. 3, the wound battery 900 has a four-layer structure, and the positive electrode sheet 91 and the negative electrode sheet 92 are separated by a second separator 93. Specifically, when the wound battery 900 is fabricated, a second separator 93, the negative electrode sheet 92, a second separator 93, and the positive electrode sheet 91 are laminated in sequence. After each lamination is completed, the whole is wound.

It can be seen from the structure of the above wound battery 900 and fabrication process thereof, since each layer (totally four layers) is fabricated independently, then stacked and wound, tightness of winding is difficult to be guaranteed. In addition, full alignment is also needed. Therefore, on one hand, an energy density is relatively low under a condition of a certain volume, and at the same time, an alignment problem may lead to a possible safety problem.

Figure 4:
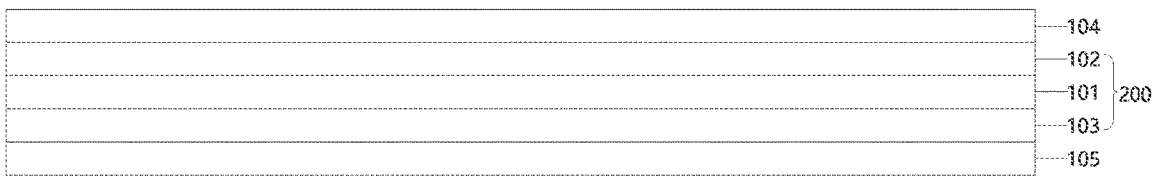
FIG. 4 is a schematic structural diagram of an electrode sheet provided in implementations of the present disclosure.
Figure 5:
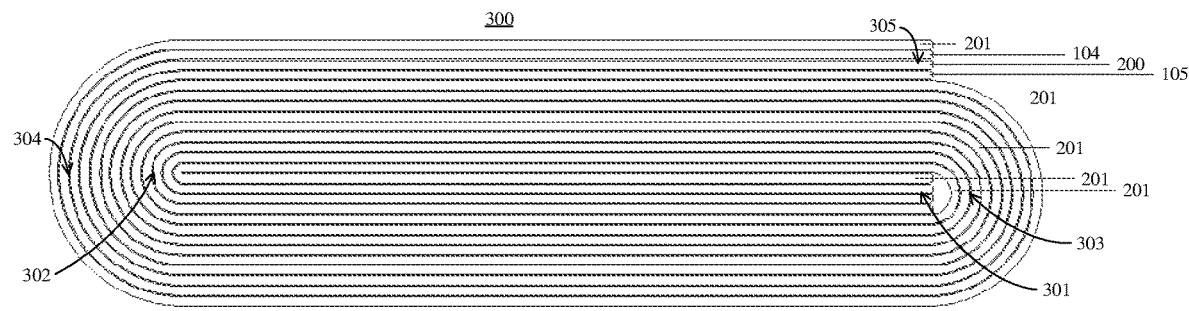
FIG. 5 is a schematic structural diagram of a wound battery based on the electrode sheet of FIG. 4 in implementations of the present disclosure.
Figure 6:
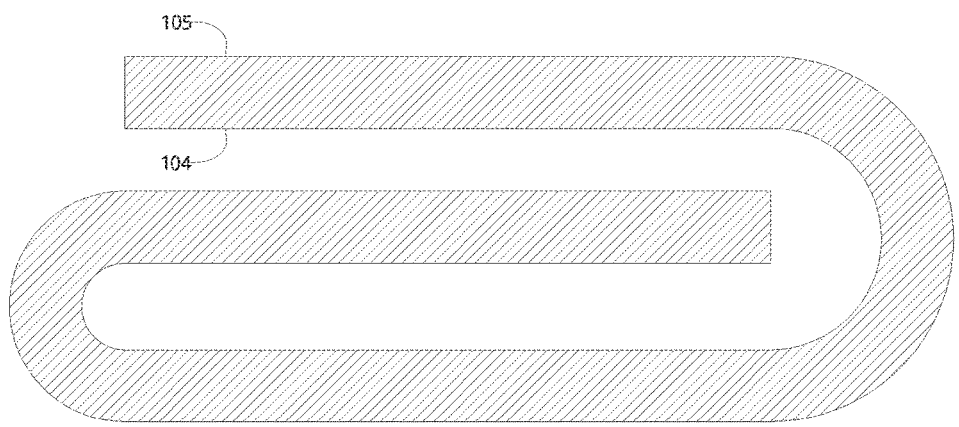
FIG. 6 illustrates a schematic structural diagram of a winding mode of the electrode sheet of FIG. 4.

In view of the above solution, in the implementations of the present disclosure, a new wound battery 300 (see FIG. 5) is provided by the inventor, and is formed by winding a flexible battery sheet 100 as illustrated in FIG. 4. The wound battery 300 may include the battery sheet 100 and a first separator 201. The battery sheet 100 may include a current collector 200, a positive active layer 104, and a negative active layer 105. Reference of a winding mode of the battery sheet 100 can be made to FIG. 6, the positive active layer 104 is in an inner circle layer, and the negative active layer 105 is in an outer circle layer.

The current collector 200 may be integrated (an integrated structure) and flexible. The integrated structure of the current collector 200 is realized by, for example, taking an insulating layer 101 as a substrate and respectively forming a positive metal layer 102 and a negative metal layer 103 on two opposite surfaces of the insulating layer 101. In some implementations, conductive metal layers may be formed on two surfaces (such as an upper surface and a lower surface in FIG. 4) in the thickness direction of a film-like insulating layer 101 by selecting a thin film material made of plastic, resin, rubber, etc., and by evaporation deposition, etc. In such a structure, the insulating layer 101 can have ideal flexibility by selection of material, and deposited metal layers have small and uniform thicknesses. Therefore, a flexible characteristic of the current collector 200 is ensured, while the existing positive current collector and the existing negative current collector are also integrated together in a mode of electrical insulation/electrical isolation, and a subsequent tedious operation of aligning the positive electrode and the negative electrode is avoided.

Different from the related art in which each layer is arranged by simple lamination, since the battery sheet with the integrated structure is adopted in the present disclosure, the battery sheet can be fabricated to have a relatively thin thickness and a specification can be more easily determined, thereby reducing the thickness and facilitating an alignment operation during winding.

Exemplarily, in a flexible current collector 200 with an integrated structure, the insulating layer 101 located in the middle (between the positive metal layer 102 and the negative metal layer 103), for example, may be made of biaxially oriented polypropylene (BOPP) film. Alternatively, the insulating layer 101 may be made of a material such as Polyethylene Terephthalate (PET), Polyimide (PI), etc. The positive metal layer 102 may be made of aluminum and the negative metal layer 103 may be made of copper. The insulating layer 101 can be properly selected according to different choices to further reduce the thickness and weight of the wound battery (thinner and lighter), thereby improving the energy density.

The positive active layer 104 and the negative active layer 105 can be correspondingly coated on the positive metal layer 102 and the negative metal layer 103 by fabricating corresponding viscous slurries, thereby correspondingly forming the flexible battery sheet 100 with the integrated structure. Exemplarily, the positive active layer 104 may be made of $LiFeSO_4$ and the negative active layer 105 may be made of graphite.

Therefore, through the above process, the current collector 200 with the integrated structure formed by the positive active layer 104, the negative active layer 105, and the current collector 200 can be obtained.

The first separator 201 may be made of, for example, woven film, nonwoven film (nonwoven cloth), microporous film, composite film, separator paper, calendered film, etc. Obviously, if just the above current collector 200 is wound, the positive electrode will be in direct contact with the negative electrode (substantially the positive active layer 104 is in contact with the negative active layer 105). Therefore, the first separator 201 can be used as an insulating material to isolate the positive active layer 104 from the negative active layer 105, to avoid a problem of short circuit.

Figure 7:
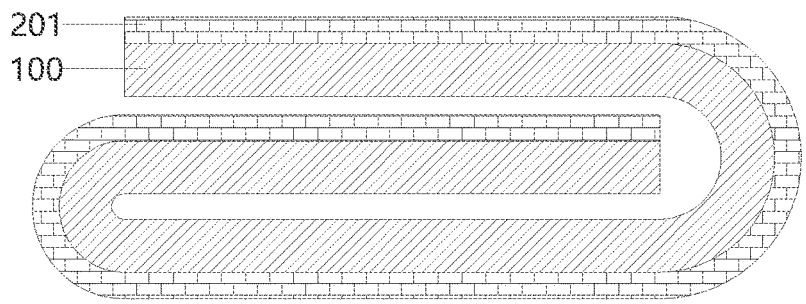
FIG. 7 illustrates a first schematic structural diagram of cooperation of a first separator and the electrode sheet based on the winding mode of FIG. 4 (a negative active layer is covered by the first separator).
Figure 8:
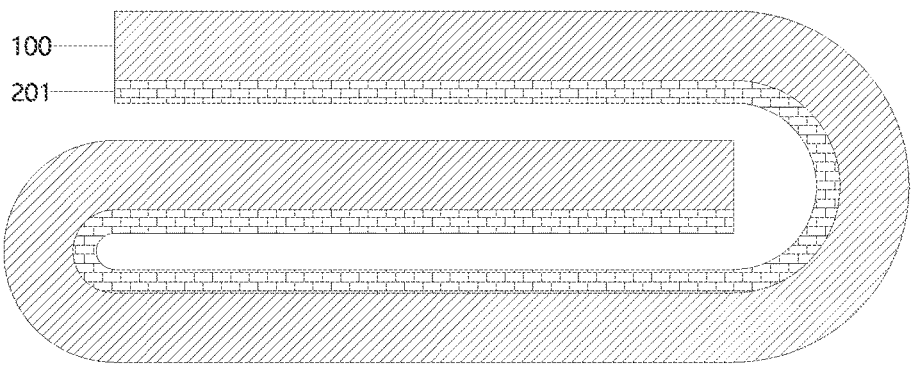
FIG. 8 illustrates a second schematic structural diagram of cooperation of a first separator and the electrode sheet based on the winding mode of FIG. 4 (a positive active layer is covered by the first separator).
Figure 9:
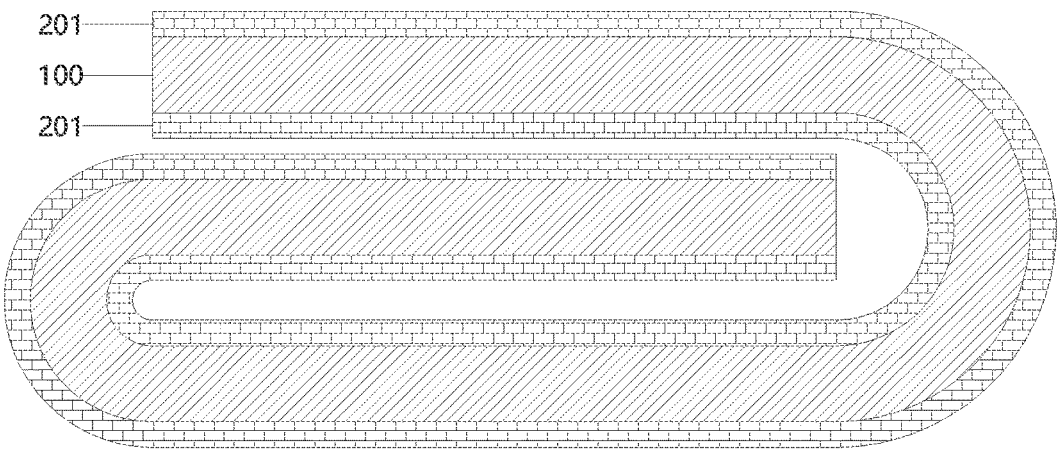
FIG. 9 illustrates a third schematic structural diagram of cooperation of a first separator and the electrode sheet based on the winding mode of FIG. 4 (a negative active layer and a negative active layer each are covered by first separators).

It should be noted that a surface of the positive active layer 104 in the current collector 200 may be covered by the first separator 201 (a first case, as illustrated in FIG. 8), or a surface of the negative active layer 105 in the current collector 200 may be covered by the first separator 201 (a second case, as illustrated in FIG. 7), or surfaces of the positive active layer 104 and the negative active layer 105 each are covered by first separators 201 (a third case, as illustrated in FIG. 9).

In addition, as an alternative solution, arrangement of the first separator 201 may be further adjusted. Exemplarily, at an outermost circle of the wound battery 300, the first separator 201 extends to the surface of the positive active layer 104 or the surface of the negative active layer 105. For example, on the flexible battery sheet forming the outermost circle of the wound battery 300, the first separator 201 may be laminated on and cover the surface of the positive active layer 104 or the negative active layer 105 of the outermost circle of flexible battery sheet.

Alternatively, for example, a length of the first separator 201 is controlled, such that in the wound battery 300 formed by winding, the first separator 201 extends to an innermost circle of the wound battery 300 and forms an inner circle section. For example, on the flexible battery sheet forming the innermost circle of the wound battery 300, the first separator 201 may be laminated on and cover the surface of the positive active layer 104 or the negative active layer 105 of the innermost circle of the flexible battery sheet.

The "innermost circle" may be an innermost ring layer among the ring layers formed by winding of the battery sheet, for example, it may be understood as a "first wound circle" which is between an initial wound end 301 of the flexible battery sheet and a second folding portion 303 formed during winding, and a folding portion is a transition section where an extension direction changes. Accordingly, the "outermost circle" may be an outermost ring layer among the ring layers formed by winding of the battery sheet, for example, it may be understood as a "last wound circle" which is between an ending wound end 305 of the flexible battery sheet and a penultimate folding portion 304 formed during winding.

Alternatively, the inner circle section may be double-layer (a solution illustrated in FIG. 5), that is, the first separator 201 extends from the initial wound end 301 to the second folding portion 303, and the first separator 201 is stacked together at the innermost circle to form a double-layer structure; or the inner circle section may be single-layer, that is, the first separator 201 extends from the initial wound end 301 to a first folding portion 302 to form a single-layer structure.

In other implementations, the innermost circle of the wound battery 300 may also not be provided with the first separator 201, which is based on the consideration that the innermost circle layer of the wound battery 300 is only formed by winding an active material layer. The active material layer may be the positive active material layer or the negative active material layer, which is different according to winding modes. The "winding mode" means that the negative active layer 105 is placed in the inner layer for winding, or the positive active layer 104 is placed in the inner layer for winding.

In addition, corresponding to the above, when the innermost circle of the wound battery 300 has the inner circle section, the first separator 201 generally has a length identical to or slightly shorter than the current collector 200, for example, half of the length of the innermost circle. When the innermost circle of the wound battery 300 has no inner circle section, the first separator 201 usually has a length shorter than the current collector 200.

On this basis, an improved wound battery 300 provided by the inventor in the implementations of the present disclosure can be obtained by combining the above current collector 200 with the integrated structure and the first separator 201 and then winding. In addition, in terms of structure, the wound battery 300 has a two-layer structure (the above first case and the above second case) or a three-layer structure (the above third case). Compared with the aforementioned four-layer structure of the wound battery 900, the wound battery 300 in the implementations of the present disclosure has a more compact structure, and fewer layers laminated by independent structural layers. Therefore, a winding speed is faster, and a winding effect is greater. In addition, the energy density of the wound battery 300 can also be improved, and easy and accurate alignment of the positive electrode and the negative electrode can also be achieved (compared with assembly alignment of an independent positive electrode and an independent negative electrode in the aforementioned wound battery 900).

Alternatively, as an improvement, a protective structure may be introduced on the basis of the above wound battery 300 to facilitate controlling occurrence of danger in extreme cases. For example, when a battery is severely impacted or squeezed, short circuit may occur inside the battery, and the short circuit will lead to accumulation of heat. When the heat is unable to be effectively and timely dissipated, the heat may be out of control, thereby resulting in fire, explosion, etc. Therefore, in order to overcome or alleviate this problem, the current collector 200 in the implementations of the present disclosure is properly adjusted. For example, active material layers formed on the surfaces of the positive metal layer 102 and the negative metal layer 103 of the current collector 200 are controlled to enable a part of the positive metal layer 102 and a part of the negative metal layer 103 to be exposed, which is also known as enabling the part of the positive metal layer 102 and the part of the negative metal layer 103 to be vacant, that is, no active materials are disposed at such partial regions.

Figure 10:
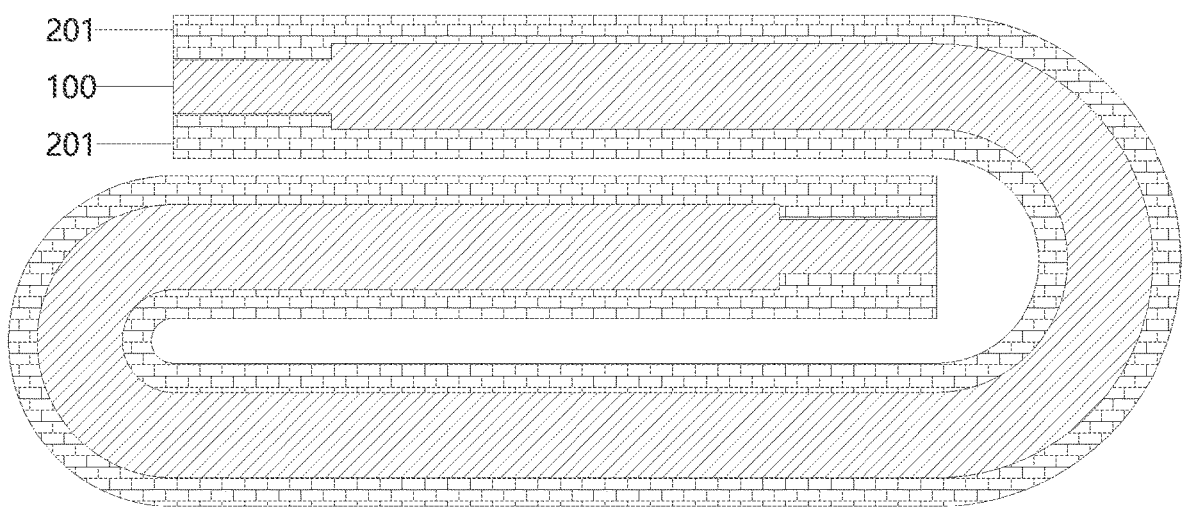
FIG. 10 is a schematic structural diagram of arrangement of exposed section based on a cooperation mode of the electrode sheet and the first separator of FIG. 9.

For example, in a region of the innermost circle of the wound battery 300, no active materials are disposed at both the positive metal layer 102 and the negative metal layer 103 corresponding to the positive metal layer 102. For example, a first exposed arrangement solution: in the region of the innermost circle of the wound battery 300, such as an initial wound section of the battery sheet, also known as a head section (as illustrated in FIG. 10), the positive metal layer 102 has a first positive exposed section located at the region, and the negative metal layer 103 has a first negative exposed section located at the region and corresponding to the first positive exposed section. Alternatively, a second exposed arrangement solution: in the region of the outermost circle of the wound battery 300, such as an ending wound section of the battery sheet, also known as a terminal section (as illustrated in FIG. 10), the positive metal layer 102 has a second negative exposed section located at the region and corresponding to the second positive exposed section.

Alternatively, in the structure of the wound battery 300, the above first exposed arrangement solution and the above second exposed arrangement solution are implemented simultaneously, as illustrated in FIG. 10.

Due to the above exposed solution of the current collector 200, the positive metal layer 102 and the negative metal layer 103 have sections at which no corresponding active materials are disposed, and both positions are corresponding to each other and isolated by the insulating layer 101, thereby forming a laminated structure of exposed aluminum-insulating layer-exposed copper. In this structure, when the wound battery 300 is excessively stimulated by the outside (enough to cause short circuit), compared with sections at which the active materials are disposed, sections at which no active materials are disposed will be short-circuited first and can shunt short-circuit current, such that the sections at which no active materials are disposed can disperse a thermal effect of short circuit and avoid excessive "accumulation" of heat, thereby solving a problem of ignition and explosion caused by excessive heating.

Figure 11:
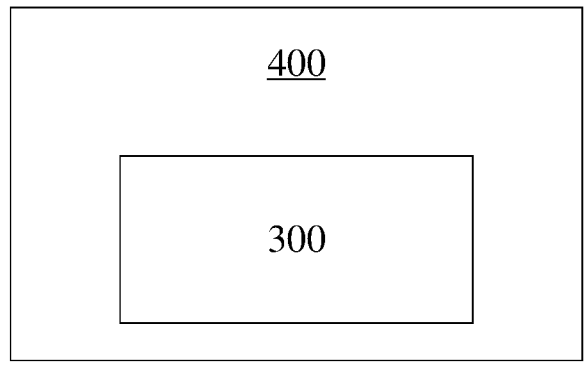
FIG. 11 is a schematic structural diagram of an energy storage device provided in implementations of the present disclosure.

Reference can be made to FIG. 11, and an energy storage device 400 is provided in the implementations of the present disclosure. The energy storage device 400 includes the wound battery 300 of any of the above implementations.

In order to make the objects, technical solutions and advantages of the implementations of the present disclosure clearer, the technical solutions of the implementations of the present disclosure will be described below clearly and completely with reference to the accompanying drawings in the implementations of the present disclosure. Obviously, the implementations to be described are some, but not all of the implementations of the present disclosure. Generally, the components of the implementations of the present disclosure, as described and illustrated in the accompanying drawings herein, may be arranged and designed in a wide variety of different configurations. Therefore, the following detailed description of the implementations of the present disclosure, as provided in the accompanying drawings, is not intended to limit the protection scope of the present disclosure as claimed, but is merely representative of selected implementations of the present disclosure. Based on the implementations of the present disclosure, all the other implementations obtained by those of ordinary skill in the art without inventive efforts would fall within the protection scope of the present disclosure.

It should be noted that similar signs and letters indicate similar items in the following accompanying drawings, and therefore, once an item is defined in an accompanying drawing, it is not necessary to further define or explain it in the subsequent accompanying drawings.

In the description of the implementations of the present disclosure, it should be noted that orientation or positional relations indicated by terms such as "inside", "outside", etc., are orientation or positional relations based on the accompanying drawings, or orientation or positional relations in which the application product is placed conventionally in use, or only for facilitating description of the present disclosure and simplifying the description, rather than indicating or implying that the referred devices or elements must be in a particular orientation, and be constructed and operated in the particular orientation, and therefore they should not be construed as position limiting the present disclosure. In addition, terms such as "first", "second", and "third" are used only for distinguishing the description, and should not be construed as indicating or implying relativity importance.

In the description of the present disclosure, it should be further noted that unless otherwise expressly specified or defined, terms such as "provide", "mount", "couple", and "connect" should be understood broadly, and for example, a fixed connection, or a detachable connection, or an integrated connection; may be a mechanical connection or an electric connection; and may be a direct connection, or an indirect connection via an intermediate medium, or may be an internal communication between two elements. The specific meanings of the above terms in the present disclosure could be understood by those of ordinary skill in the art according to specific situations.

The foregoing is only a preferred implementation of the present disclosure and is not intended to limit the disclosure which may be subject to various modifications and variations to those of ordinary skill in the art. Any modifications, equivalents, modifications, etc. made within the spirit and principles of this disclosure shall be within the scope of protection of this disclosure.

To sum up, the wound battery is provided in the present disclosure, the thickness of which can be effectively reduced, and high requirements for alignment accuracy are reduced, such that the wound battery can be fabricated with the higher winding density to obtain the higher energy density, thereby improving or even solving problems of a large wound battery thickness and limited increase in energy density.

What is claimed is:

1. A wound battery formed by winding a battery sheet, comprising:
    a flexible battery sheet with an integrated structure, wherein the battery sheet comprises a current collector, a positive active layer, and a negative active layer, wherein the current collector has an insulating layer as a substrate, and a positive metal layer and a negative metal layer which are formed on surfaces of two sides of the insulating layer, wherein the positive active layer is formed on a surface of the positive metal layer, and wherein the negative active layer is formed on a surface of the negative metal layer; and an insulating separator laminated on and covering a surface of the positive active layer and/or a surface of the negative active layer, and configured to prevent the positive active layer from directly contacting the negative active layer.

2. The wound battery of claim 1, wherein the separator extends to an innermost circle of the wound battery and forms an inner circle section.

3. The wound battery of claim 2, wherein the inner circle section is double-layer.

4. The wound battery of claim 2, wherein the inner circle section is single-layer.

5. The wound battery of claim 1, wherein an innermost circle of the wound battery is not provided with the separator.

6. The wound battery of claim 1, wherein the separator has a length identical to or slightly shorter than the current collector.

7. The wound battery of claim 1, wherein a part of the positive metal layer and a part of the negative metal layer are exposed.

8. The wound battery of claim 7, wherein the positive metal layer has a first positive exposed section located in a region of an innermost circle of the wound battery and the negative metal layer has a first negative exposed section located in the region of the innermost circle and corresponding to the first positive exposed section.

9. The wound battery of claim 8, wherein the region of the innermost circle comprises an initial wound section of the flexible battery sheet.

10. The wound battery of claim 7, wherein the positive metal layer has a second positive exposed section located in a region of an outermost circle of the wound battery and the negative metal layer has a second negative exposed section located in the region of the outermost circle and corresponding to the second positive exposed section.

11. The wound battery of claim 10, wherein the region of the outermost circle comprises an ending wound section of the flexible battery sheet.

12. The wound battery of claim 1, wherein the separator extends to the surface of the positive active layer and the surface of the negative active layer in an outermost circle of the wound battery.

13. The wound battery of claim 1, wherein the positive active layer is made of $LiFeSO_4$.

14. The wound battery of claim 1, wherein the negative active layer is made of graphite.

15. The wound battery of claim 1, wherein the positive metal layer is made of aluminum.

16. The wound battery of claim 1, wherein the negative metal layer is made of copper.

17. The wound battery of claim 1, wherein the insulating layer is made of a material selected from a group comprising: plastic, resin, and rubber.

18. The wound battery of claim 17, wherein the plastic is at least one of biaxially oriented polypropylene (BOPP) film, polyethylene terephthalate (PET), or polyimide (PI).

19. The wound battery of claim 1, wherein the positive metal layer and the negative metal layer which have relatively small and uniform thicknesses are formed on two surfaces of the insulating layer in a thickness direction of the insulating layer by evaporation deposition respectively.

20. An energy storage device, comprising:
a wound battery formed by winding a battery sheet, wherein the wound battery comprises:
a flexible battery sheet with an integrated structure, wherein the battery sheet comprises a current collector, a positive active layer, and a negative active layer, wherein the current collector has an insulating layer as a substrate, and a positive metal layer and a negative metal layer which are formed on surfaces of two sides of the insulating layer, wherein the positive active layer is formed on a surface of the positive metal layer, and wherein the negative active layer is formed on a surface of the negative metal layer; and
an insulating separator laminated on and covering a surface of the positive active layer and/or a surface of the negative active layer, and configured to prevent the positive active layer from directly contacting the negative active layer.

* * * * *